United States Patent
Cao et al.

(10) Patent No.: US 12,354,142 B2
(45) Date of Patent: Jul. 8, 2025

(54) METHOD AND SYSTEM FOR DISTRIBUTING SMART CONTAINERS

(71) Applicant: Alibaba Group Holding Limited, George Town (KY)

(72) Inventors: Haitao Cao, Hangzhou (CN); Wanxi Ren, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 18/469,788

(22) Filed: Sep. 19, 2023

(65) Prior Publication Data

US 2024/0005369 A1 Jan. 4, 2024

Related U.S. Application Data

(63) Continuation of application No. 16/745,740, filed on Jan. 17, 2020, now Pat. No. 11,798,045, which is a continuation of application No. 14/962,281, filed on Dec. 8, 2015, now Pat. No. 10,572,913.

(30) Foreign Application Priority Data

Dec. 10, 2014 (CN) .......................... 201410754321.0

(51) Int. Cl.
*G06Q 30/04* (2012.01)
*G06Q 10/0832* (2023.01)
*G06Q 10/0836* (2023.01)
*G06Q 30/0283* (2023.01)

(52) U.S. Cl.
CPC ......... *G06Q 30/04* (2013.01); *G06Q 10/0832* (2013.01); *G06Q 10/0836* (2013.01); *G06Q 30/0284* (2013.01)

(58) Field of Classification Search
CPC ............... G06Q 30/04; G06Q 10/0832; G06Q 10/0836; G06Q 30/0284; G06Q 10/083
See application file for complete search history.

(56) References Cited

U.S. PATENT DOCUMENTS

| 6,116,506 A | 9/2000 | Matsumoto |
| 6,230,971 B1 | 5/2001 | Matsumoto |
| 6,843,414 B2 | 1/2005 | Madrid |

(Continued)

FOREIGN PATENT DOCUMENTS

| CA | 2354464 | 2/2002 |
| CN | 203224900 | 10/2013 |
| GB | 2483474 | 3/2012 |

OTHER PUBLICATIONS

Zhu, Wangyi, et al. "Smart Locker [NFC smart locker control]." (2014) (Year: 2014).*

(Continued)

*Primary Examiner* — George Chen
(74) *Attorney, Agent, or Firm* — Van Pelt, Yi & James LLP

(57) ABSTRACT

A smart container is disclosed. The smart container includes a container body having at least one storage division, a timekeeping unit configured to keep time of a deposit-removal cycle for a storage division to obtain a timekeeping result, a billing unit configured to receive the timekeeping result from the timekeeping unit of the deposit-removal cycle for the specific storage division and calculate a storage fee based on the timekeeping result, and a displaying unit being for displaying the storage fee calculated by the billing unit.

9 Claims, 8 Drawing Sheets

(56) References Cited

U.S. PATENT DOCUMENTS

| | | |
|---|---|---|
| 6,899,268 B2 | 5/2005 | Hara |
| 7,002,472 B2 | 2/2006 | Stratmoen |
| 8,528,097 B2 | 9/2013 | Ginter |
| 9,223,315 B2 | 12/2015 | Irwin |
| 2001/0042024 A1 | 11/2001 | Rogers |
| 2002/0080030 A1* | 6/2002 | Inomata ............... G07F 17/0014 340/542 |
| 2002/0177922 A1 | 11/2002 | Bloom |
| 2002/0178074 A1 | 11/2002 | Bloom |
| 2004/0084478 A1 | 5/2004 | Floyd |
| 2004/0267640 A1* | 12/2004 | Bong ................... G07F 17/0042 705/28 |
| 2005/0232747 A1 | 10/2005 | Brackmann |
| 2006/0033616 A1 | 2/2006 | Silva |
| 2007/0124020 A1 | 5/2007 | Staples |
| 2007/0159327 A1 | 7/2007 | Belden |
| 2007/0186064 A1 | 8/2007 | Roh |
| 2008/0016361 A1 | 1/2008 | Ginter |
| 2008/0022100 A1 | 1/2008 | Ginter |
| 2009/0015405 A1 | 1/2009 | DiPoala |
| 2012/0078413 A1 | 3/2012 | Baker, Jr. |
| 2012/0215572 A1 | 8/2012 | Schneur |
| 2013/0038450 A1 | 2/2013 | Stewart |
| 2013/0119129 A1 | 5/2013 | Amdahl |
| 2013/0144428 A1 | 6/2013 | Irwin |
| 2013/0212036 A1 | 8/2013 | Klingenberg |
| 2013/0307382 A1 | 11/2013 | Garrison |
| 2014/0012773 A1 | 1/2014 | Matthews |
| 2014/0035721 A1* | 2/2014 | Heppe ................ G07C 9/00309 340/5.54 |
| 2014/0316918 A1 | 10/2014 | Zaniker |
| 2014/0330603 A1* | 11/2014 | Corder .................... G07F 17/13 705/7.12 |
| 2015/0106293 A1 | 4/2015 | Robinson |
| 2015/0120602 A1 | 4/2015 | Huffman |
| 2015/0178780 A1 | 6/2015 | Yang |
| 2015/0186840 A1 | 7/2015 | Torres |
| 2015/0371187 A1 | 12/2015 | Irwin |
| 2016/0034987 A1 | 2/2016 | Shaaban |
| 2016/0148154 A1 | 5/2016 | Tibbs |
| 2016/0171568 A1 | 6/2016 | Cao |
| 2016/0278558 A1 | 9/2016 | Ansari |
| 2017/0091710 A1 | 3/2017 | Van Dyke |
| 2017/0228944 A1 | 8/2017 | Lan |

OTHER PUBLICATIONS

Subramaniam et al., "Real time mailbox alert system via SMS or email," 2007 Asia-Pacific Conference on Applied Electromagnetics, 2007, pp. 1-4, doi: 10.1109/APACE.2007.4603963. (Year: 2007).

* cited by examiner

METHOD AND SYSTEM FOR DISTRIBUTING SMART CONTAINERS

CROSS REFERENCE TO OTHER APPLICATIONS

This application is a continuation of U.S. patent application Ser. No. 16/745,740, entitled METHOD AND SYSTEM FOR DISTRIBUTING SMART CONTAINERS filed Jan. 17, 2020 which is incorporated herein by reference for all purposes, which is a continuation of U.S. patent application Ser. No. 14/962,281, entitled METHOD AND SYSTEM FOR DISTRIBUTING SMART CONTAINERS filed Dec. 8, 2015, now U.S. Pat. No. 10,572,913, which claims priority to People's Republic of China Patent Application No. 201410754321.0, entitled A SMART CONTAINER AND A SMART CONTAINER-BASED DISTRIBUTION SYSTEM, filed Dec. 10, 2014, both of which are incorporated herein by reference for all purposes.

FIELD OF THE INVENTION

The present application relates to a method and a system for distributing smart containers.

BACKGROUND OF THE INVENTION

Existing smart containers were initially developed from supermarket storage lockers. The existing smart containers are often integrated with smart terminals (e.g., devices comprising computer processors and/or displays), and some of the smart containers also have networking capability. However, typically, the existing smart containers have some disadvantages as a critical link in logistical distribution. Conventionally, smart container-based logistical systems suffer from the following.

First, conventional smart container-based logistical systems cannot effectively prohibit users from using smart containers as long-term storage lockers. When the smart containers are inefficiently occupied for long periods of time as regular storage lockers, the smart containers cannot be used for actual express delivery.

Secondly, in conventional smart container-based logistics systems, during the delivery process, logistical personnel cannot promptly learn information related to the distributed locations of smart containers or real-time traffic conditions. The logistical personnel are unable to make reasonable distribution route plans based on the information related to the distributed locations of smart containers or the real-time traffic conditions, resulting in increases in logistical costs and delays in distribution times.

Thirdly, in conventional smart container-based logistics systems, the logistical personnel pick-up link is used as follows: typically, after a consignor or sender submits an order, a specific pick-up person is sent to the premises or picks up the goods via a smart container. The pick-up person is typically not responsible for making the actual deliveries, or is only responsible for a small number of deliveries. Pick-ups by the logistics personnel are typically not integrated with the deliveries, and as a result, a large amount of human and financial resources are wasted.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present application provides embodiments of a method and a system for distributing smart containers. The present application also discloses embodiments of a technique for acquiring a distribution route, distributing equipment, generating distribution routes, distributing goods, picking up goods, and allocating pick-up digital certificates.

Figure 1:
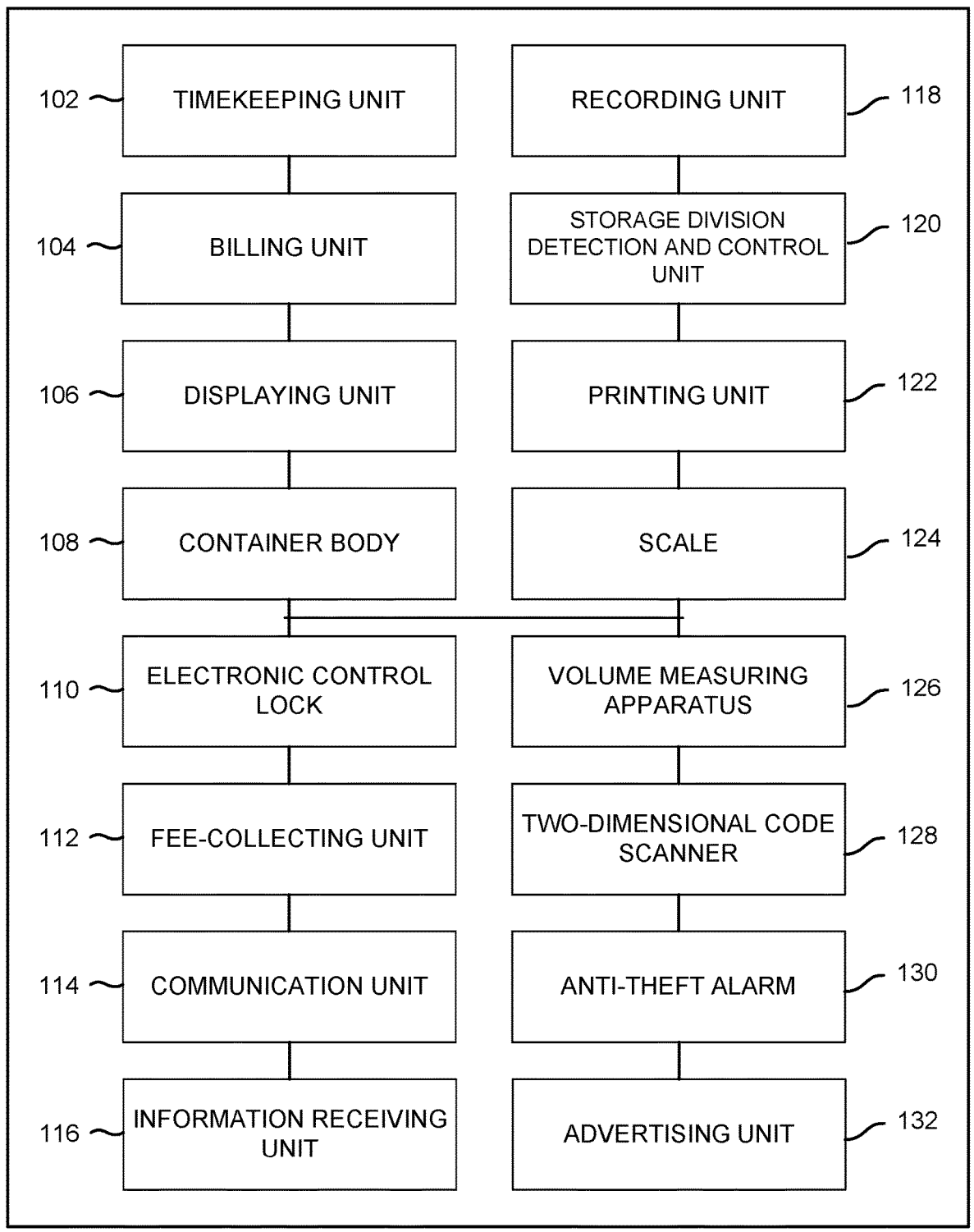
FIG. 1 illustrates a diagram of an embodiment of a smart container.

FIG. 1 illustrates a diagram of an embodiment of a smart container. In some embodiments, the smart container 100 includes a timekeeping unit 102, a billing unit 104, and a displaying unit 106.

In some embodiments, the timekeeping unit 102 is configured to keep time of a deposit-removal cycle for each storage division to generate a timekeeping result. The timekeeping unit 102 can be implemented as a timer, a digital clock, or the like.

A process for timekeeping using the timekeeping unit 102 includes: starting to keep time when a person performs a deposit operation in a deposit-removal cycle for a storage division, ceasing to keep time when goods are removed, and acquiring a timekeeping result of the deposit-removal cycle for the specific storage division (e.g., a specific compartment in the smart container). In some embodiments, the timekeeping unit 102 is activated by the person depositing the item in the storage division and stopped by the person removing the item from the storage division. In some embodiments, the timekeeping unit 102 is automatically activated when a scale detects that an item has been placed within the storage division, and automatically stopped when the scale detects that the item has been removed from the storage division.

In some embodiments, the billing unit 104 is configured to receive the timekeeping result from the timekeeping unit 102 and calculate a storage expense based on the timekeeping result.

In some embodiments, a process for calculating the storage expense includes: in the event that the timekeeping result is less than a set length T0, then the billing result corresponds to no charge; in the event that the timekeeping result is greater than the set length T0, then the billing result to be collected is set based on a set rate.

In various embodiments, one of the following techniques can be used to set the rate: A) the rate corresponds to a fixed storage fee; B) the setting of the rate includes: obtaining an excess time length by subtracting the time length T0 from the timekeeping result, and multiplying the excess time length by a set per unit time rate; or C) the setting of the rate includes: obtaining an excess time length by subtracting the time length T0 from the timekeeping result and dividing the excess time length into a certain number of ranges based on different intervals, the different excess time length ranges corresponding to different per unit time rates.

In some embodiments, the displaying unit 106 is configured to display the storage expense calculated by the billing unit 104. The displaying unit 106 can be implemented using a light emitting diode (LED)/liquid crystal display (LCD) or the like.

In some embodiments, the smart container 100 further comprises: a container body 108 having at least one storage division, an electronic control lock 110, a fee-collecting unit 112, a communication unit 114, an information receiving unit 116, a recording unit 118, a storage division detection and control unit 120, a printing unit 122 for printing vouchers, a scale 124, a volume measuring apparatus 126, a two-dimensional code scanner 128, an anti-theft alarm 130, and an advertising unit 132.

In some embodiments, the container body 108 includes one storage division or includes various storage divisions in multiple sizes, such as a large storage division, a medium-sized storage division, and a small storage division. Goods are placed in the storage divisions based on the size of the delivered goods. Light emitting diode (LED) lamps are provided inside each of the storage divisions for illumination. Each of the storage divisions is provided with an electronic control lock to secure the each storage division. The container body 108 including the at least one storage division can be made from metal plates or other metal materials.

For example, specifications of the small storage division correspond to 20 cm×20 cm×20 cm, specifications of the medium-sized storage division correspond to 30 cm×30 cm×30 cm, and specifications of the large storage division correspond to 80 cm×50 cm×30 cm. The storage dimensions of the three kinds of dimensions are used to deposit express delivery items of goods having corresponding sizes.

In some embodiments, upon receiving an open instruction, the electronic control lock 110 is configured to become unlocked to put the storage division into an opened state to facilitate a deposit operation or a removal operation. In some embodiments, the receiving of the open instructions includes receiving a digital voucher from a logistics data center. In some embodiments, the digital voucher includes a digital certificate used to open the storage division. The fee-collecting unit 112 can issue the open instruction to open the electronic control lock 110. In some embodiments, the smart container 100 is configured to supply power to the electronic control lock 110 using a 24-hour uninterruptible power supply.

In some embodiments, the fee-collecting unit 112 is configured to receive a storage fee and a shipment fee calculated by the billing unit 104. In some embodiments, the fee-collecting unit 112 is configured to receive and count external currency or electronic currency payment amounts and compare the external currency or the electronic currency payment amounts to the received calculated fees. In some embodiments, the received calculated fees includes the sum of the storage fee and the shipment fee. In the event that the payment amount is greater than or equal to the received fees, the fee-collecting unit 112 issues an open instruction to the electronic control lock 110. In the event that the fee-collecting unit 112 receives the external currency, the fee-collecting unit 112 is also configured to determine whether the currency amount is greater than the storage fee. In the event that the currency amount is greater than the storage fee, the fee-collecting unit 112 is to provide change for the received external currency via a coin or bill receptor. Examples of electronic currency payment techniques include: Alipay, credit cards, bank cards, near field communication (NFC), or other ways of making payments electronically.

In some embodiments, the communication unit 114 is configured to connect with a remote network. Through the remote network, the communication unit 114 can obtain remote management instructions for each storage division from and transmit information concerning each storage division to a remote server. In some embodiments, the communication unit 114 is implemented as a wireless fidelity (WiFi) transceiver, a general packet radio service (GPRS) transceiver, a third generation of mobile telecommunications (3G) transceiver, an Ethernet transceiver, any other appropriate communications transceiver, or any combination thereof.

In some embodiments, the information receiving unit 116 is configured to receive external information. The external information can refer to information received from an external keyboard or touch screen configured to accept user input commands. In some embodiments, the external information comprises codes that can control issuing of open instructions for electronic control locks 110. In some embodiments, the information receiving unit 116 comprises: a touchpad and an external input keyboard.

In some embodiments, the recording unit 118 is configured to automatically record actions of depositing goods into or removing goods from the storage division detection and control unit 120. The recording unit 118 is implemented using a digital camera/recorder in some embodiments.

In some embodiments, the storage division detection and control unit 120 is configured to provide use status and type of each specific storage division to the storage division detection and control unit 120. For example, the use status indicates "reserved" or "not reserved." In some embodiments, the storage division detection and control unit 120 is configured to use optical recognition to measure volume or weight detection to measure weight of a specific storage division to determine a use status of the specific storage division. The storage division detection and control unit 120 can transmit the use status of each specific storage division via the communication unit 114. The storage division detection and control unit 120 can receive use authority reservations for the storage divisions transmitted by the communication unit 114 and determine reserved storage divisions based on the use authority reservations. Moreover, the storage division detection and control unit 120 can provide, via the communication unit 114, "reservation successful" messages to the external device that presented the use authority reservations. The controlling of the use of the reserved storage divisions based on the use authority reservations includes one of the following approaches:

In one approach, the storage division detection and control unit 120 is further configured to set, record, and issue, via the communication unit 114, reservation digital certificates to reservation equipment, the reservation digital certificates being digital vouchers for subsequent use of the reserved storage divisions. In some embodiments, the reservation digital certificates are generated by the storage division detection and control unit 120. In some embodiments, the reservation digital certificates are generated by the logistics data center initially and stored on the storage division detection and control unit 120. In some embodiments, the digital certificates can be generated using a hash function or other appropriated functions.

In another approach, the storage division detection and control unit 120 is further configured to receive reservation digital certificates transmitted by the communication unit 114 and record the received reservation digital certificates, the reservation digital certificates being digital vouchers for subsequent use of reserved storage divisions.

The determining of the reserved storage areas based on the use authority reservations includes one of the following:

In some embodiments, in the event that the use authority reservation includes information designating the reserved storage division, the storage division detection and control unit 120 determines the reserved storage division based on the designated reserved storage division.

In some embodiments, in the event that the use authority reservation does not include information designating a reserved storage division, the storage division detection and control unit 120 determines an appropriate storage division as the reserved storage division based on the storage division request in the use authority reservation and the use status of each storage division recorded by the storage division detection and control unit 120.

In some embodiments, the printing unit 122 is configured to print vouchers. The vouchers can include standard bar codes as well as two-dimensional codes (e.g., QR codes). In some embodiments, the printing unit 122 includes: an ink-jet ticket printer, a laser ticket printer, a dot-matrix ticket printer, a thermal ticket printer, a thermal wax printer, a laser printer, or any combination thereof.

In some embodiments, the scale 124 is configured to weigh goods when the goods are to be shipped, and to calculate the weight of the goods. Scale 124 can be implemented using a digital scale.

In some embodiments, the volume measuring apparatus 126 is configured to measure a volume of goods when the goods are to be shipped and calculate the volume of the goods. For example, one technique for measuring the volume of the goods includes scanning the dimensions of the goods.

The scale 124, the volume measuring apparatus 126, or a combination thereof is in the smart container 100. In the event that the smart container 100 is used to ship goods, a goods delivery fee is calculated based on the results of the scale 124 weighing the goods or the volume measuring apparatus 126 measuring the volume of the goods.

In some embodiments, the two-dimensional code scanner 128 is configured to recognize coded patterns or images, and input the coded patterns or the images. The two-dimensional code scanner 128 is also configured to recognize quick response (QR) codes and barcodes.

In some embodiments, the anti-theft alarm 130 is configured to send an alarm message (e.g., an alarm code, a text message, an email, or the like) to a security system through the communication unit 114 upon determining that the electronic control lock 110 was opened in the event that no open instruction had been received, or issue an alarm signal like a flashing light, a sound, or a combination thereof, which is not sent to the security system.

In some embodiments, the advertising unit 132 is configured to: in the event that the smart container 100 is not reserved, instruct the displaying unit 106 to switch to an advertising page. In addition to switching to an advertising page, the advertising unit 132 is further configured to tabulate distribution information of items in the smart container 100 to implement precise placement of advertisements. In some embodiments, the advertising unit 132 is further configured to link up with online shops and serve as an e-commerce portal via the communication unit 114. In some embodiments, the advertising unit 132 is also configured to accept advertisement layout ordering service requests and layout the advertisements accordingly.

Some of the units described above can be implemented as software components executing on one or more processors, as hardware components such as programmable logic devices (e.g., microprocessors, field-programmable gate arrays (FPGAs), digital signal processors (DSPs), etc.), Application Specific Integrated Circuits (ASICs) designed to perform certain functions, or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The units may be implemented on a single device or distributed across multiple devices. The functions of the units may be merged into one another or further split into multiple sub-units.

Figure 2:
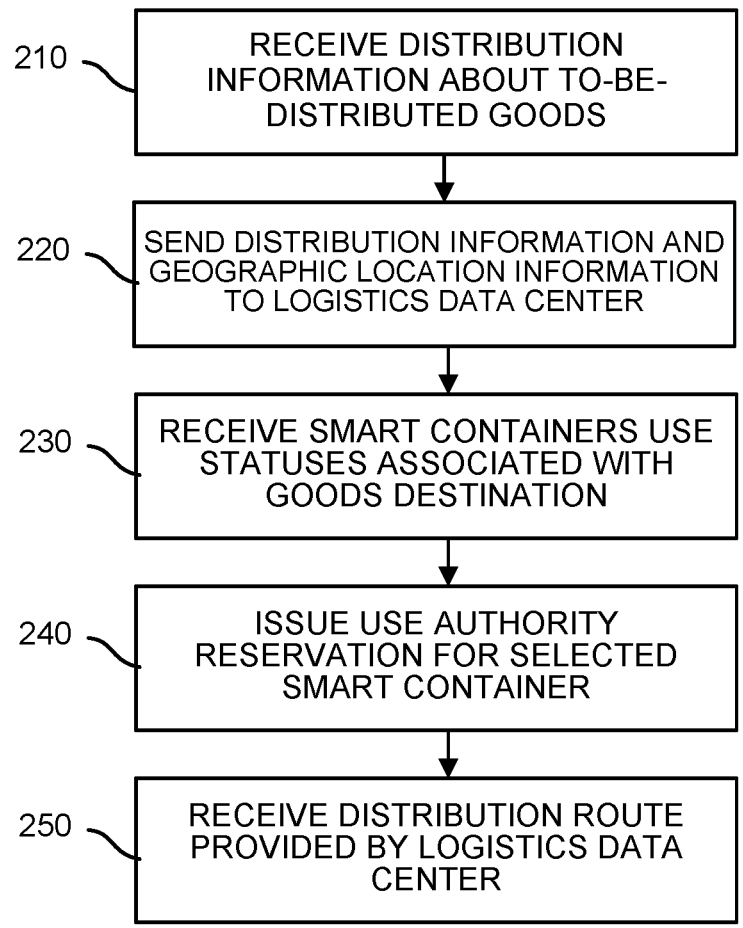
FIG. 2 illustrates a flowchart of an embodiment of a process for acquiring a distribution route.

FIG. 2 illustrates a flowchart of an embodiment of a process for acquiring a distribution route. In some embodiments, the process 200 is implemented by the distribution equipment 720 of FIG. 7 and includes:

In some embodiments, the distribution equipment receives, from a logistics data center (and its associated server), distribution information about to-be-distributed goods, use statuses of smart containers associated with goods destinations, distribution routes, and reservation digital certificates. The distribution equipment reserves a specific storage division based on the use statuses of the smart containers and sends the distribution information, the geographic location of the distribution equipment, and the reservation for using the selected smart container to the logistics data center. In some embodiments, the distribution equipment maintains state information of the storage divisions, and uses the state information to ensure that a storage division can only be reserved by one party at a time.

In 210, the distribution equipment receives distribution information about to-be-distributed goods.

In some embodiments, the distribution information includes a destination and a recipient of the to-be-distributed goods.

In some embodiments, the receiving of the distribution information about to-be-distributed goods can be performed as follows: the distribution equipment scans two-dimensional code tags on the to-be-distributed goods to acquire distribution information about the to-be-distributed goods, and the two-dimensional code tags record the distribution information about the to-be-distributed goods. The distribution information includes a destination and a recipient of the to-be-distributed goods.

For example, after the distribution equipment is used to scan the two-dimensional code tags on the to-be-distributed goods to obtain the distribution information, the distribution equipment receives a recipient address, a recipient name, shipper information, order information of the goods, and remarks information by decoding the scanned two-dimensional codes.

In 220, the distribution equipment sends the distribution information and geographic location information to a logistics data center.

In some embodiments, after obtaining the distribution information of the to-be-distributed goods, the distribution equipment sends, via a network, a connect request to the logistics data center to establish a communication connection. The distribution equipment receives, from the logistics data center, a feedback message agreeing to establish the communication connection and establishes the communication connection with the logistics data center. After the communication connection is established, the distribution equipment sends the distribution information and the geographic location (e.g., coordinates) of the distribution equipment to the data logistics center. The remote network can be accessed by WiFi, GPRS, 3G, cable Ethernet, or any combination thereof.

After sending the distribution information and the geographic location information of the distribution equipment to the logistics data center, the process 200 further comprises:

In 230, the distribution equipment receives, from the logistics data center, smart containers use statuses associated with the goods destination. For example, the use statuses indicate "reserved" or "not reserved." A use status of a storage division indicating that the storage division is "reserved" can indicate that the storage division currently contains goods.

In 240, the distribution equipment issues a use authority reservation for a selected smart container based on the smart container use statuses.

The issuing of the use authority reservation for the selected smart container based on the smart container use statuses further comprises displaying information about candidate smart containers, receiving the candidate smart container selection, and issuing a use authority reservation for the selected smart container based on the selection result.

In some embodiments, the candidate smart container selection includes a designation of a specific storage division of the selected smart container or a designation of a storage division type of the selected smart container. The use authority reservation includes the designation of a specific storage division or the designation of a storage division type.

Please note that after the use authority reservation is selected for the smart container, the smart container storage division can only be opened by a corresponding reservation digital certificate, and the use status for the smart container storage division is changed to "reserved."

For example, the dimensions of merchandise are 30 cm×20 cm×30 cm. The destination address for the distribution merchandise is Location A. Express delivery personnel select the smart container nearest Location A. A medium-sized storage division that conforms to the merchandise dimensions is reserved in the smart container. In the event that the medium-sized storage division has already been reserved, the express delivery personnel can reserve a storage division that has other dimensions but that can also accept a deposit of the merchandise. The reserved smart container storage division can only be opened by the reservation digital certificate.

In 250, the distribution equipment receives a distribution route provided by the logistics data center.

In some embodiments, the distribution route provided by the logistics data center is implemented as follows: after the distribution equipment establishes the communication connection with the logistics data center, the distribution equipment receives the distribution route from the logistics data center. The distribution route is planned based on the geographic location information of the distribution equipment, the geographic location information of the selected smart container, and real-time route condition information to generate the most time-saving and fuel-saving distribution route. After receiving the distribution route, the distribution equipment also receives a reservation digital certificate sent from the logistics data center. The reservation digital certificate is a digital voucher for opening the selected storage division of the selected smart container. In some embodiments, the reservation digital certificate includes a two-dimensional code tag, a string of numbers or characters, or a combination thereof. Of course, any conventional feasible form of digital authentication, or other new digital authentication schemes that are to arise as technology progresses can be used.

Figure 3:
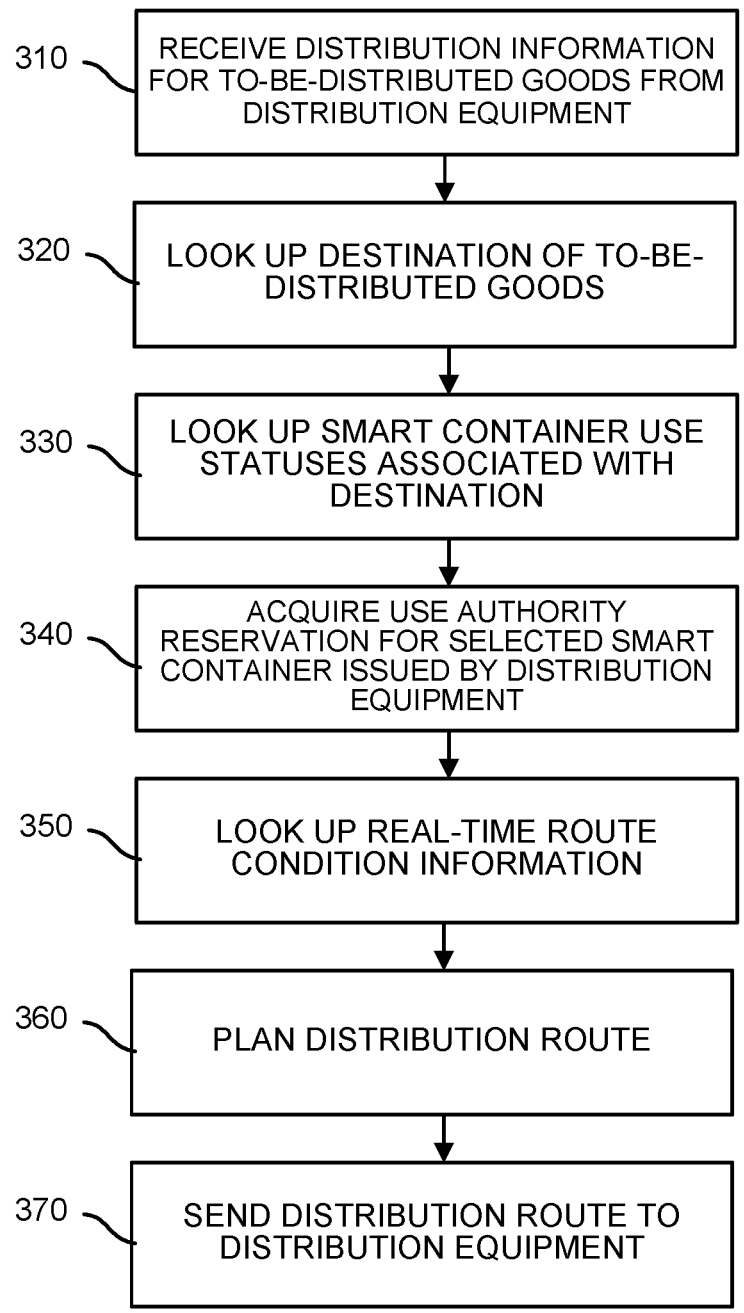
FIG. 3 illustrates a flowchart of an embodiment of a process for generating a distribution route.

FIG. 3 illustrates a flowchart of an embodiment of a process for generating a distribution route. In some embodiments, the process 300 is implemented using the logistics data center 730 of FIG. 7.

In some embodiments, the logistics data center (via its servers) gathers various information associated with logistics, including route condition information, smart container use status information, various kinds of requests sent via smart containers, distribution equipment status information, and various kinds of requests sent by distribution equipment. Examples of the various requests sent via the smart containers include a connection request with the data center, a communication request, a request (initiated by a user) to open a storage division, a scan code request, a billing request, a print ticket request, a shipping request, a user action request, etc. Examples of the various requests sent via the distribution equipment include a request to reserve a smart container, a request to open a storage division of a smart container, etc.

In 310, the logistics data center receives distribution information for to-be-distributed goods from distribution equipment, the distribution information includes destination of the to-be-distributed goods and recipient of the to-bedistributed goods, and also receives geographic location information of the distribution equipment.

In some embodiments, the receiving of the distribution information of the to-be-distributed goods from the distribution equipment includes: the logistics data center receives a connect request (sent from the distribution equipment via a remote network) to establish a communication connection. The logistics data center sends a feedback message to the distribution equipment to establish the communication connection. The distribution equipment establishes the communication connection with the logistics data center. After establishing the communication connection, the logistics data center receives, from the distribution equipment, the distribution information of the to-be-distributed goods and the geographic location information of the distribution equipment. The distribution information includes destination of the to-be-distributed goods and recipient of the to-be-distributed goods. The remote network can be accessed by: WiFi, GPRS, 3G, cable Ethernet, or any combination thereof.

In 320, the logistics data center looks up the destination of the to-be-distributed goods based on the distribution information and a database of the smart containers and their locations.

With the distribution information, the destination of the to-be-distributed goods can be looked up as follows: look up all the smart containers within a range centered on the destination and regard all the looked up smart containers as candidate smart containers.

For example, look up all smart containers within an area having a radius of five hundred meters with the destination as the center of the area.

After looking up the destination of the to-be-distributed goods based on the distribution information, the process 300 further comprises:

In 330, the logistics data center looks up smart container use statuses associated with the destination and forwards the smart container use statuses to the distribution equipment.

In 340, the logistics data center acquires a use authority reservation for the selected smart container issued by the distribution equipment, and sends the use authority reservation to the selected smart container.

The smart container use statuses include smart container storage division use status information (e.g., whether the smart container storage division is reserved) and storage division type information.

A reservation digital certificate is sent to the distribution equipment. The reservation digital certificate is used to open the selected storage division of the selected smart container. The reservation digital certificate comes from the smart container, or the reservation digital certificate is provided to the smart container at the same time it is sent to the distribution equipment after the reservation digital certificate is generated by the logistics data center. In some embodiments, the reservation digital certificate comprises: a two-dimensional code tag and a string of numbers or characters. In some embodiments, the string can include a combination of numbers and characters in a random order. Any conventional feasible form of digital authentication or other new digital authentication schemes that are to arise as technology progresses can be used.

In 350, the logistics data center looks up real-time route condition information.

In some embodiments, the looking up of the route condition information in real time includes the logistics data center querying a weather and traffic service for the real-time route condition information near and between the two locations, i.e., the destination of the to-be-distributed goods and the geographic location of the distribution equipment.

In 360, the logistics data center plans the distribution route based on the geographic location information of the distribution equipment, the geographic location information of the selected smart container, and the real-time route condition information, and generates the distribution route.

In some embodiments, planning of the distribution route is implemented as follows: determine the departure point and the destination based on the geographic location information of the distribution equipment and the geographic location information of the selected smart container. Then select the shortest, most unobstructed route based on the real-time route conditions between the two points. For example, multiple possible routes are evaluated and the route that results in the shortest travel time, shortest travel distance, the least tolls, or a combination score is selected in some embodiments. Of course, in the actual selection process, different previously determined selection criteria can result in different route selection schemes depending on the situation.

The objective of the planning operation is to determine the route based on real-time route conditions and dynamically select the route that best conforms to the selection criteria to attain lower transportation costs and save time.

In 370, the logistics data center sends the distribution route to the distribution equipment.

In some embodiments, the logistics data center sends the distribution route to the distribution equipment based on the communication connection with the distribution equipment.

Figure 4:
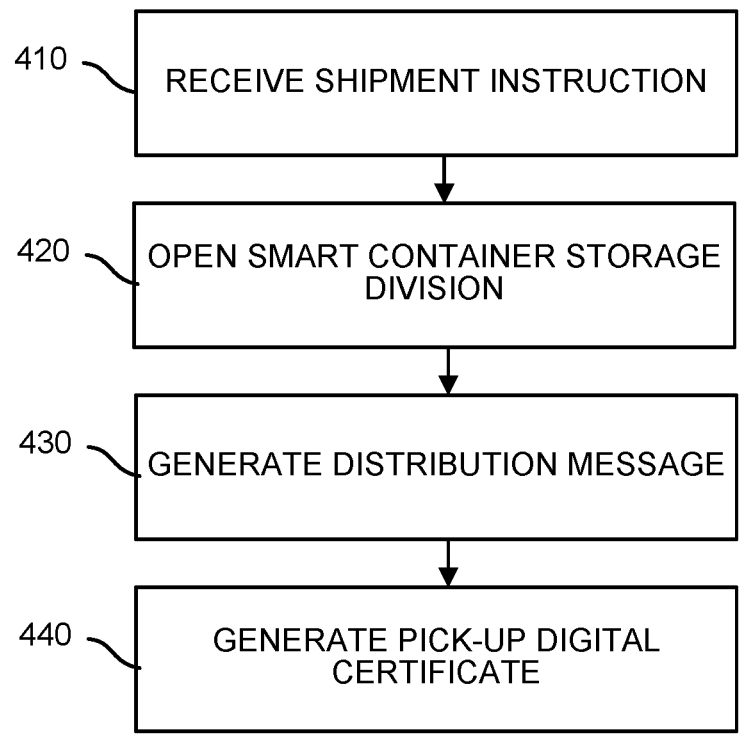
FIG. 4 illustrates a flowchart of an embodiment of a process for distributing goods.

FIG. 4 illustrates a flowchart of an embodiment of a process for distributing goods. In some embodiments, the process 400 is implemented by the smart container 710 of FIG. 7 and comprises:

Typically, the smart container receives a shipment instruction, which includes a reservation digital certificate or a shipment initiation order. Based on the shipment instruction, the smart container opens a storage division door and sends a distribution message to the logistics data center.

In 410, the smart container receives a shipment instruction, the shipment instruction including distribution information for shipped goods.

At least two distribution scenarios exist. In a first distribution scenario, a shipper sending goods himself or herself does not need a reservation digital certificate. Accordingly, in the first distribution scenario, the shipment instruction is not required to include a reservation digital certificate. In a second scenario, a courier is to use a reservation digital certificate to open the container. Accordingly, in the second distribution scenario, the shipment instruction includes a reservation digital certificate.

In some embodiments, the shipment instruction further includes a reservation digital certificate. In some embodiments, the receiving of the shipment instruction includes: scanning, using a two-dimensional code scanner of the smart container, the reservation digital certificate in the distribution equipment. The reservation digital certificate includes information on the reserved storage division and the distribution information about the to-be-distributed goods. In some embodiments, the information on the reserved storage division and the distribution information are recognized and analyzed by the two-dimensional code scanner. In some embodiments, an externally input reservation digital certificate is received through an information receiving unit of the smart container, and thus the reserved storage division information and the distribution information about the to-be-distributed goods, which are in the reservation digital certificate, are acquired. The distribution information includes the destination of the to-be-sent goods and recipient of the to-be-distributed goods. The reservation digital certificate includes a two-dimensional code tag, any string of numbers or characters, or a combination thereof. Of course, any conventional feasible form of digital authentication, or other new digital authentication schemes that are to arise as technology progresses can be used.

After the receiving of the shipment instruction, the smart container determines whether the reservation digital certificate is correct. As an example, the smart container, through the remote network, sends a connect request to the logistics data center to establish a communication connection. The smart container receives from the logistics data center a feedback message agreeing to establish the communication connection and establishes a communication connection with the logistics data center. After the communication connection is established, the smart container sends a query to the logistics data center, the query requesting to look up a reservation digital certificate for the reserved storage division, and the smart container receives the reservation digital certificate fed back by the logistics data center. The smart container determines whether the fed back reservation digital certificate is consistent with the externally input reservation digital certificate. In the event that the reservation digital certificate is consistent with the externally input reservation digital certificate, the process 400 proceeds to operation 420. In the event that the reservation digital certificate is not consistent with the externally input reservation digital certificate, the shipment instruction is to be deemed "not received." The remote network can be accessed by WiFi, GPRS, 3G, cable Ethernet, or any combination thereof.

In some embodiments, the receiving of the shipment instruction includes a shipment technique where the express delivery person opens a specific storage division with the reservation digital certificate after arriving at the reserved smart container storage division. In addition, the receiving of the shipment instruction can further comprise:

The smart container receives a shipment initiation command.

The smart container receives distribution information and weighs the goods. In some embodiments, the distribution information includes a recipient address and a recipient name. In some embodiments, the weighing of the goods includes measuring goods weight based on the smart container scale or measuring the volume of the goods based on the volume measuring apparatus.

In some embodiments, the smart container displays prompts for the consignor or sender to fill in additional shipment information. The prompts include express delivery companies that may be used, shipper information, remarks, or any combination thereof.

In some embodiments, the smart container receives user selections or entries, and regards the selections or the entries as a part of the distribution information included in the shipment instruction.

In some embodiments, the receiving of the shipment instruction includes: after activating a shipment button on the smart container, the shipper initiates a shipment command. The shipper inputs goods distribution information through the information receiving unit and measures the weight of the goods using the smart container scale or measures the volume of the goods using the volume measuring apparatus. After he or she finishes weighing the goods, the shipper selects one express delivery company from a list of express delivery companies, inputs shipper information and remarks, and selects a storage division suitable for the volume of goods. The goods distribution information that is input includes recipient address and recipient name.

After completing the selection of the express delivery company, the shipment fee for the goods can be calculated based on the selected express delivery company, and the weight and volume of the goods. The shipment fee for the goods is received via the fee-collecting unit. In the event that the payment amount is greater than or equal to the shipment fee, an open instruction is issued to the electronic control lock. The receiving of the shipment fees for goods includes: external currency, Alipay, bank cards, NFC, or other ways of paying shipment fees electronically. In the event that the fee-collecting unit receives external currency, the fee-collecting unit also is to determine whether the external currency amount is greater than the shipment fee. In the event that the currency amount is greater than the shipment fee, the fee-collecting unit is to use a coin or bill receptor to provide change for the received external currency.

After the smart container receives a shipment instruction, the smart container activates the recording unit to start recording.

In 420, the smart container opens the smart container storage division based on the shipment instruction.

After the smart container receives the shipment instruction, an open instruction is issued to the electronic control lock. After the electronic control lock receives the open instruction, the smart container storage division is opened, and the goods are deposited in the storage division.

Please note that, in some embodiments, in the event that the receiving of the shipment instruction includes scanning a reservation digital certificate, an open instruction is issued to the electronic control lock of the reserved storage division. In the event that the receiving of the shipment instruction includes receiving a shipment initiation command, an open instruction is issued to the electronic control lock of the storage division that is suitable for the goods volume selected by the shipper.

In 430, in the event that the storage division is shut, the smart container generates a distribution message based on the distribution information included in the shipment instruction, the smart container geographic location information, and the storage division serial number, and sends the distribution message to the logistics data center.

In some embodiments, in the event that the receiving of the shipment instruction includes scanning a reservation digital certificate, after the goods are deposited in the storage division and the storage division door is shut, the smart container sends the distribution message to the logistics data center. In the event that the receiving of the shipment instruction includes receiving a shipment initiation command, after the goods are deposited in the storage division and the storage division door is shut, and before the distribution message is sent to the logistics data center, the smart container establishes a communication connection with the logistics data center. The distribution message includes the distribution information in the shipment instruction, the smart container geographic location, and the storage division serial number.

After the storage division is shut, the generating of the distribution message further comprises:

The recording unit ceases to record, the recorded content being saved locally at the smart container or uploaded to the logistics data center.

After the storage division is shut, the timekeeping unit begins to keep time.

After the storage division is shut, the smart container changes the use status of the storage division.

An example of a specific timekeeping technique of the timekeeping unit includes starting to keep time when a deposit operation in the deposit-removal cycle is performed for a specific storage division, ceasing to keep time when the goods are removed, and acquiring the timekeeping result of the deposit-removal cycle for the specific storage division.

As an example, the changing of the storage division use status includes: modifying the storage division use status to "reserved." A storage division having an "reserved" status can only be opened with a pick-up digital certificate corresponding to the storage division. A storage division that is "reserved" cannot be opened by the shipment instruction or be reserved by the distribution equipment. The pick-up digital certificate includes: a two-dimensional code tag, any string of numbers or characters, or a combination thereof. Of course, any conventional feasible form of digital authentication or other new digital authentication schemes that are to arise as technology progresses can be used.

In 440, the smart container generates a pick-up digital certificate, and sends the pick-up digital certificate to the logistics data center, or receives a pick-up digital certificate generated by the logistics data center.

After the distribution message is sent to the logistics data center, generating a pick-up digital certificate is also to be performed. In some embodiments, the pick-up digital certificate is generated by the smart container. In some embodiments, after the pick-up digital certificate is generated, the pick-up digital certificate is sent, via the communication connection, to the logistics data center. In some embodiments, the pick-up digital certificate is generated by the logistics data center. The pick-up digital certificate includes a two-dimensional code tag, any string of numbers or characters, or a combination thereof. Of course, any conventional feasible form of digital authentication or other new digital authentication schemes that are to arise as technology progresses can be used.

Figure 5:
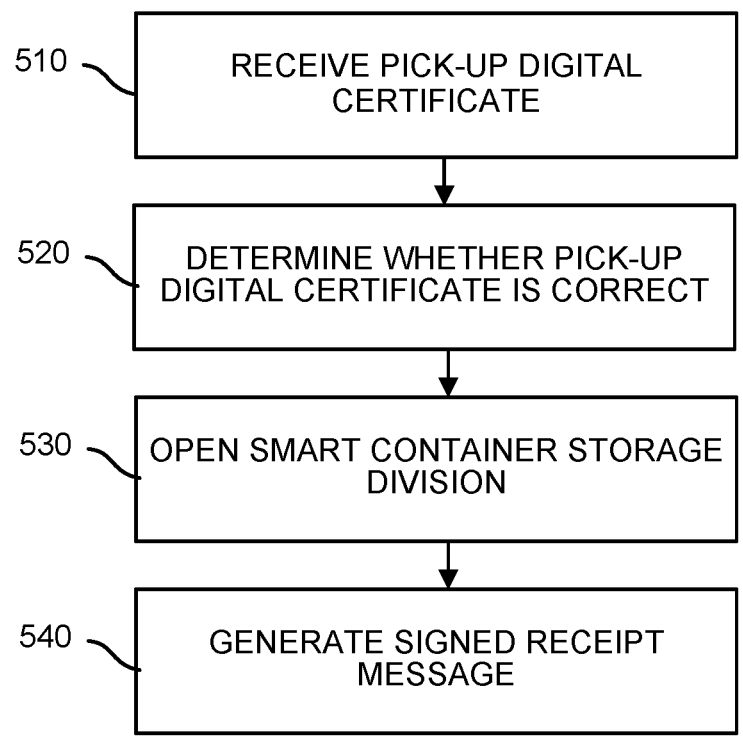
FIG. 5 illustrates a flowchart of an embodiment of a process for picking up goods.

FIG. 5 illustrates a flowchart of an embodiment of a process for picking up goods. In some embodiments, the process 500 is implemented by the smart container 710 of FIG. 7 and comprises:

In some embodiments, the smart container receives a pick-up digital certificate and determines whether the pick-up digital certificate is correct. In the event that the pick-up digital certificate is correct, the smart container storage division is opened and a signed receipt message is sent to the logistics data center.

In 510, the smart container receives a pick-up digital certificate.

In some embodiments, the receiving of the pick-up digital certificate includes: scanning, using a two-dimensional code scanner of the smart container, the pick-up digital certificate in the mobile terminal of the recipient or the distribution equipment. In some embodiments, the two-dimensional code scanner recognizes and analyzes a storage division serial number in the pick-up digital certificate. In some embodiments, an externally input pick-up digital certificate is received through the information receiving unit, and thus the storage division serial number in the pick-up digital certificate is acquired. The pick-up digital certificate includes a two-dimensional code tag, any string of numbers or characters, or a combination thereof. Of course, any conventional feasible form of digital authentication or other new digital authentication schemes that are to arise as technology progresses can be used.

Before the receiving of the pick-up digital certificate, the following can also be performed: the express delivery personnel's distribution equipment or the recipient's mobile terminal receives the pick-up digital certificate. The pick-up digital certificate is sent to the mobile terminal of the recipient as follows: the pick-up digital certificate can by generated by the smart container. After the pick-up digital certificate is generated, the pick-up digital certificate is sent to the logistics data center via the communication connection. In some embodiments, after storing the pick-up digital certificate, the logistics data center forwards the pick-up digital certificate to the mobile terminal of the recipient. In some embodiments, after generating the pick-up digital certificate, the logistics data center provides the pick-up digital certificate to the smart container and at the same time provides the pick-up digital certificate to the mobile terminal of the recipient. The pick-up digital certificate includes a two-dimensional code tag, any string of numbers or characters, or a combination thereof. Of course, any conventional feasible form of digital authentication, or other new digital authentication schemes that are to arise as technology progresses can be used.

When the pick-up digital certificate is sent to the mobile terminal of the recipient, the sent content further includes goods information, smart container location, the storage division serial number where the goods are located, a final deadline when the pick-up can be performed without a storage fee being charged, or any combination thereof.

The sending of the pick-up digital certificate to the mobile terminal of the recipient is performed via a text message, mail, communication software having the appropriate function, or any combination thereof.

Please note that the sending of the pick-up digital certificate to the distribution equipment of the express delivery personnel is further explained below.

After the smart container receives the pick-up digital certificate, the smart container activates the recording unit, which begins to record.

In 520, the smart container determines whether the pick-up digital certificate is correct.

In some embodiments, after the receiving of the pick-up digital certificate, the smart container, via a remote network, sends a connect request to the logistics data center to establish a communication connection. The smart container receives a feedback message from the logistics data center agreeing to establish the communication connection and establishes the communication connection with the logistics data center. After the communication connection is established, the smart container sends a query, to the logistics data center, requesting to look up the pick-up digital certificate for the storage division based on a serial number, and the smart container receives the pick-up digital certificate sent back by the logistics data center. The smart container determines whether the fed back pick-up digital certificate is consistent with the externally input pick-up digital certificate. In the event that the sent back pick-up digital certificate is consistent with the externally input pick-up digital certificate, control passes to operation 530. In the event that the fed back pick-up digital certificate is not consistent with the externally input pick-up digital certificate, the pick-up digital certificate is to be deemed "not received." The remote network can be accessed via WiFi, GPRS, 3G, cable Ethernet, or any combination thereof.

In 530, in the event that the pick-up digital certificate is correct, the smart container opens a smart container storage division.

Before the opening of the smart container storage division, operation 530 can further comprise: the timekeeping unit stops keeping time; the billing unit calculates the storage fee based on the timekeeping result; and after the smart container collects the storage fee, the smart container opens the smart container storage division.

In some embodiments, the calculating of the storage fee based on the timekeeping result comprises: in the event that the timekeeping result is less than a set length T0, the billing result corresponds to no charge; and in the event that the timekeeping result is greater than the set length T0, the smart container collects a storage fee based on a set rate.

In some embodiments, the set rate corresponds to: A) a fixed storage fee; B) obtaining an excess time length by subtracting the time length T0 from the timekeeping result, and multiplying the excess time length by a set per unit time rate; or C) obtaining the excess time length by subtracting the time length T0 from the timekeeping result and using different intervals to divide the excess time length into a certain number of ranges, the different excess time length ranges corresponding to different per unit time rates.

In the event that, when the billing unit of the smart container collects a storage fee, the fee-collecting unit receives external currency, the smart container also is to determine whether the external currency amount is greater than the storage fee. In the event that the currency amount is greater than the storage fee, the smart container is to provide change for the received external currency via on a coin or bill receptor and open the smart container storage division. In the event that the amount is less than the fee, the displaying unit of the smart container is to prompt the user to pay the storage fee shortfall. The receiving of the shipment fees for goods includes: external currency, Alipay, bank cards, NFC, or other ways of paying shipment fees electronically.

After the smart container collects the storage fee, the smart container issues an open instruction to the electronic control lock. After the electronic control lock receives the open instruction, the smart container storage division is opened, and the goods are picked up from the storage division.

In 540, in the event that the storage division is shut, the smart container generates a signed receipt message, and sends the signed receipt message to the logistics data center.

In some embodiments, the signed receipt message is generated in the event that the storage division is shut. The signed receipt message is sent to the logistics data center as follows: after an express delivery person removes the goods and shuts the storage division door, the express delivery person selects "pick-up confirmed" and then sends the pick-up confirmation to the logistics data center. In the event that, after removing the goods and shutting the storage division door, the recipient selects "signed receipt confirmed," the smart container sends a signed receipt message confirming signed receipt to the logistics data center and an instruction to delete the video associated with the goods. In the event that, after picking up the goods, the recipient discovers that the goods are damaged or fail to meet expectations, the recipient returns the goods to the storage division, shuts the storage division door, and selects "signed receipt refused." The smart container sends a signed receipt message indicating refused signed receipt to the logistics data center and an instruction to save the video associated with the goods.

In some embodiments, after the storage division is shut, the following operations are performed: the recording unit ceases to record, the recorded content is locally stored at the smart container or uploaded to the logistics data center, and the smart container changes the use status of the storage division based on the receipt message.

In some embodiments, the changing of the storage division use status includes, in the event that the signed receipt message is "pick-up confirmed," the smart container changes the use status of the storage division to "not reserved." In the event that the signed receipt message is "signed receipt confirmed," the smart container changes the use status of the storage division to "not reserved." In the event that the signed receipt message is "signed receipt refused," the smart container does not change the use status of the storage division.

Figure 6:
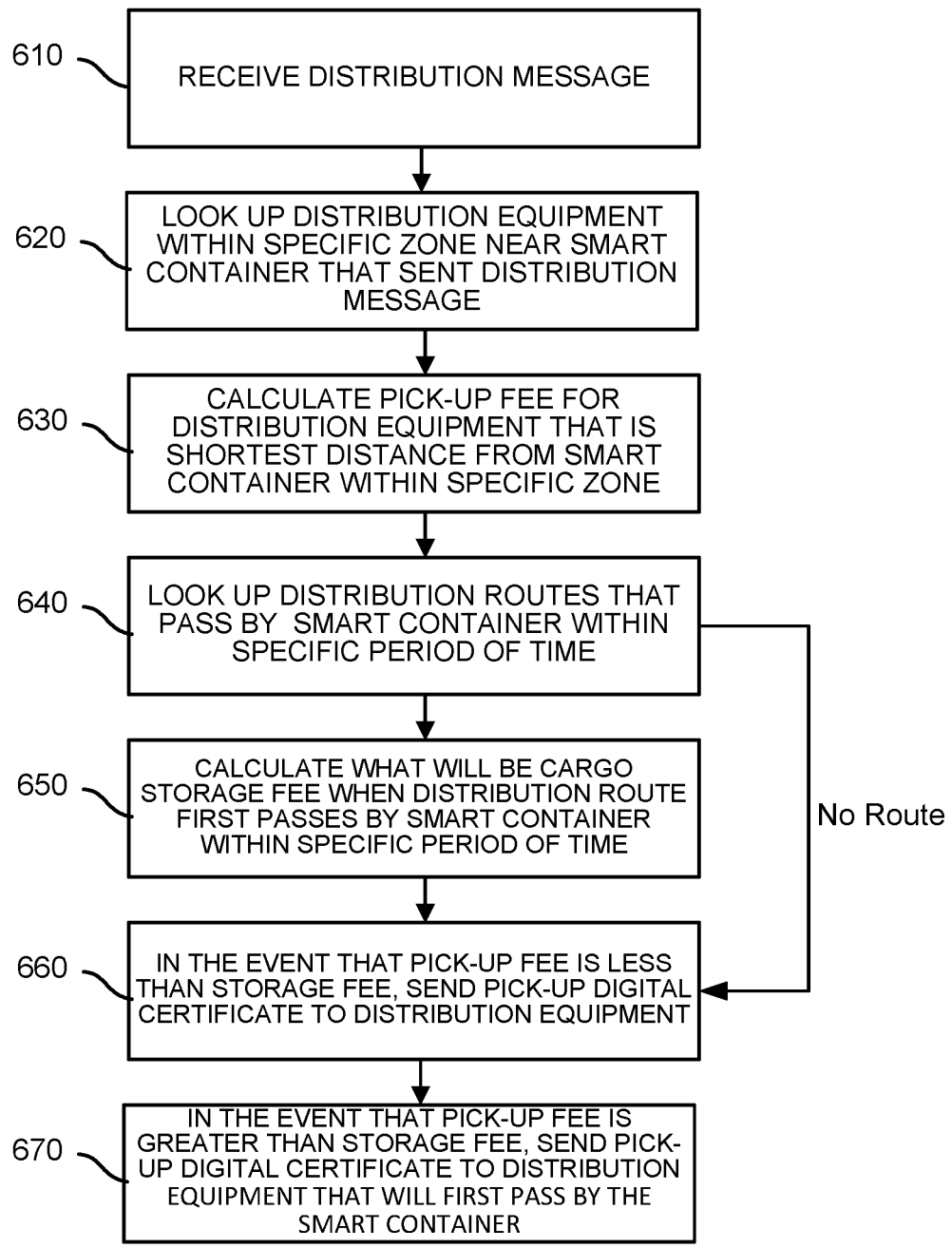
FIG. 6 illustrates a flowchart of an embodiment of a process for allocating pick-up digital certificates.

FIG. 6 illustrates a flowchart of an embodiment of a process for allocating pick-up digital certificates. In some embodiments, the process 600 is implemented by the logistics data center 730 of FIG. 7.

Typically, the logistics data center receives a distribution message from a smart container, collects distribution equipment information within a specific zone near a smart container and distribution routes that pass by the smart container within a specific period of time, and calculates a pick-up fee and a storage fee.

In 610, the logistics data center receives a distribution message.

In some embodiments, the receiving of the distribution message comprises: the logistics data center receives a connect request (sent to the logistics data center by the smart container via a remote network) to establish a communication connection. The logistics data center sends to the smart container a feedback message agreeing to establish the communication connection. The smart container establishes the communication connection with the logistics data center. After establishing the communication connection, the logistics data center receives distribution information from the smart container. The distribution message comprises: distribution information about the goods to be sent, the smart container geographic location, the storage division serial number, or any combination thereof. The remote network can be accessed by WiFi, GPRS, 3G, cable Ethernet, or any combination thereof.

In 620, the logistics data center looks up, in a database of distribution equipment and their corresponding zones, a distribution equipment within a specific zone near the smart container that sent the distribution message.

The logistics data center looks up distribution equipment within a specific area centered on the smart container based on the geographic location of the smart container. The looked up distribution equipment is regarded as candidate distribution equipment, and the location information of the candidate distribution equipment is acquired.

For example, the logistics data center looks up all distribution equipment within a five kilometer radius using the smart container that sent said distribution message as the center. The logistics data center regards the looked up distribution equipment as candidate distribution equipment, and acquires the location information of all candidate distribution equipment.

In 630, the logistics data center calculates a pick-up fee for the distribution equipment that is the shortest distance from the smart container within the specific zone.

In some embodiments, the logistics data center regards the location information of the candidate distribution equipment which is the shortest distance from the smart container as the departure point, and regards the location information of the smart container as the end point. The logistics data center generates a distribution route between the two points, and calculates the pick-up fee based on the generated distribution route.

In 640, the logistics data center looks up distribution routes that pass by the smart container within a specific period of time.

The logistics data center looks up distribution routes that have already been generated. The logistics data center determines whether a distribution route that passes the smart container exists. In the event that the distribution route that passes the smart container exists, the logistics data center regards the looked up distribution routes as candidate distribution routes.

In the event that no distribution route is to pass the smart container within a specific period of time, control passes to operation 660.

In 650, the logistics data center calculates what the goods storage fee will be when a distribution route first passes by the smart container within the specific period of time.

In some embodiments, the logistics data center ranks the candidate distribution routes based on the time when the distribution routes are to pass the smart container, acquires the earliest time when the smart container is to be passed, and calculates the storage fee based on a billing method of the billing unit.

For example, assume that the time is now 16:45. In the event that the earliest time when the smart container will be passed on a distribution route is 18:00, then the timekeeping result for calculating the storage fee with the billing method of the billing unit will be 75 minutes (1:15 hours).

In another example, the billing method of the billing unit includes: in the event that the timekeeping result is less than a set length T0, the billing result is no charge; and in the event that the timekeeping result is greater than the set length T0, the logistics data center collects a storage fee based on a set rate.

One of the following techniques corresponds to the set rate: A) the set rate is a fixed storage fee; B) the set rate is determined based on obtaining the excess time length by subtracting the time length T0 from the timekeeping result and multiplying the excess time length by a set per unit time rate; and C) the set rate is determined based on obtaining the excess time length by subtracting the time length T0 from the timekeeping result and dividing the excess time length into a certain number of ranges based on different intervals, the different excess time length ranges corresponding to different per unit time rates.

In 660, in the event that the pick-up fee is less than the storage fee, the logistics data center sends a pick-up digital certificate to the distribution equipment that is the shortest distance from the smart container.

In 670, in the event that the pick-up fee is greater than the storage fee, the logistics data center sends a pick-up digital certificate to the distribution equipment that will first pass by the smart container.

Figure 7:
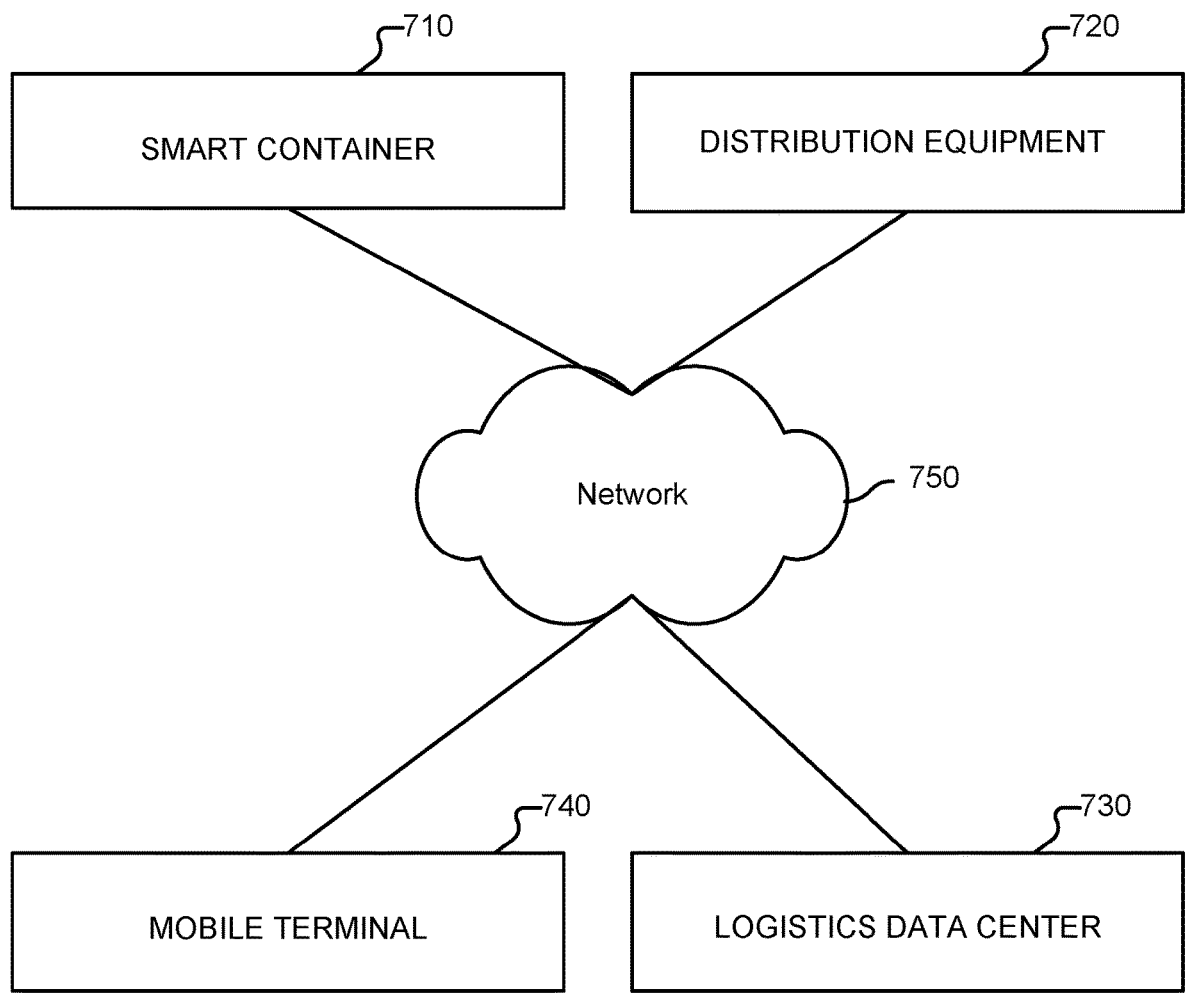
FIG. 7 illustrates a diagram of an embodiment of a system for distributing smart containers.

FIG. 7 illustrates a diagram of an embodiment illustrating a system for distributing smart containers. In some embodiments, the system 700 is configured to perform the process 200 of FIG. 2, process 300 of FIG. 3, process 400 of FIG. 4, process 500 of FIG. 5, and process 600 of FIG. 6 and comprises: a smart container 710, a distribution equipment 720, a logistics data center 730, and a mobile terminal of a recipient 740, which are all connected via a network 750.

In some embodiments, the smart container 710 is configured to receive, ship, and store goods. In some embodiments, the smart container 710 is configured to network with the logistics data center 730, send to the logistics data center 730 status information that reflects the use status of each specific storage division of the smart container 710, receive reservation information for the specific container sent by the logistics data center 730, reserve a specific storage division based on the reservation information, and open the reserved storage division based on a reservation digital certificate associated with the reservation information.

In some embodiments, the distribution equipment 720 (e.g., a delivery vehicle with an onboard communication and computing device) is configured to transport goods and receive information distribution routes and reservation digital certificates for the smart container 710 sent by the logistics data center 730. Moreover, the distribution equipment 720 is configured to send the geographic location information of the distribution equipment 720 to the logistics data center 730 and distribution information for to-be-distributed goods. The distribution equipment 720 includes a specialized device having communication and display functions, a personal computer on which is installed the appropriate software, a portable device, an electronic tablet, a personal digital assistant (PDA), a mobile telephone, or any combination thereof.

In some embodiments, the logistics data center 730 is configured to receive the storage division status information provided by the smart container 710 and the geographic location information and the distribution information sent by the distribution equipment 720, store smart container geographic location information, and receive route information relating to route calculations and route condition information. By using the route information, the logistics data center 730 is configured to calculate and generate distribution routes, and send the generated distribution routes to the distribution equipment 720. In addition, the logistics data center 730 is configured to send reservation information for specific storage divisions of smart containers and the reservation digital certificates associated with the reservation information to the smart container 710.

In some embodiments, the mobile terminal 740 of the recipient is configured to receive a delivery notification of goods. The delivery notification includes the smart container location information where the delivered goods are located and the pick-up digital certificates to open the associated storage divisions. The mobile terminal of the recipient includes a personal computer, portable device, an electronic tablet, a personal digital assistant (PDA), a mobile telephone, or any combination thereof.

In some embodiments, the smart container 710 includes a timekeeping unit and a billing unit.

In some embodiments, the timekeeping unit is configured to keep time while the goods are stored.

In some embodiments, the billing unit is configured to calculate the storage division use fee that should be collected based on a timekeeping result of the timekeeping unit.

Figure 8:
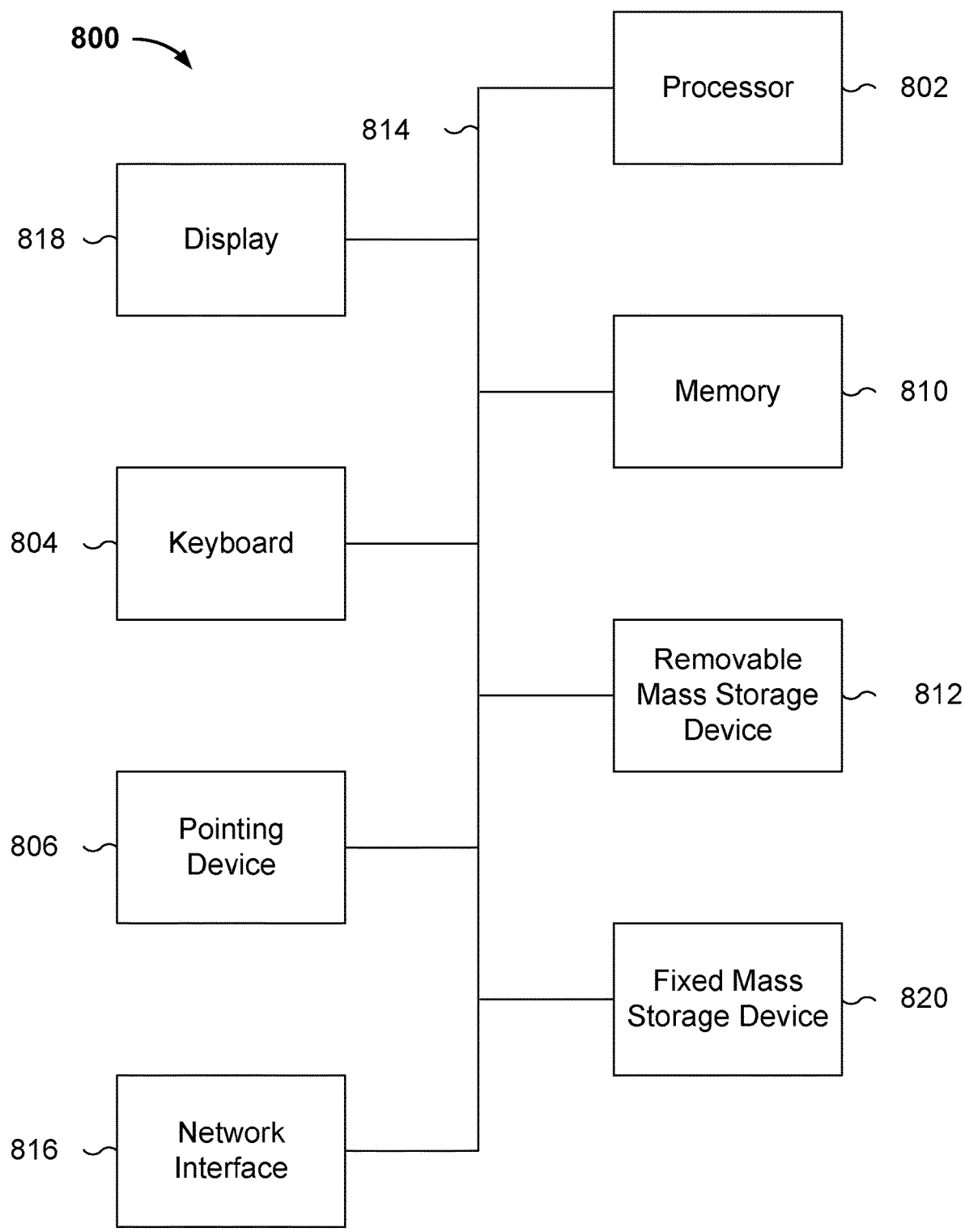
FIG. 8 illustrates a functional diagram of an embodiment of a programmed computer system for distributing smart containers.

FIG. 8 illustrates a functional diagram of an embodiment of a programmed computer system for distributing smart containers. As will be apparent, other computer system architectures and configurations can be used to distribute smart containers. Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (e.g., display 818).

Processor 802 is coupled bi-directionally with memory 810, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data, and objects used by the processor 802 to perform its functions (e.g., programmed instructions). For example, memory 810 can include any suitable computer-readable storage media, described below, depending on whether, for example, data access needs to be bi-directional or uni-directional. For example, processor 802 can also directly and very rapidly retrieve and store frequently needed data in a cache memory (not shown).

A removable mass storage device 812 provides additional data storage capacity for the computer system 800, and is coupled either bi-directionally (read/write) or uni-directionally (read only) to processor 802. For example, storage 812 can also include computer-readable media such as magnetic tape, flash memory, PC-CARDS, portable mass storage devices, holographic storage devices, and other storage devices. A fixed mass storage 820 can also, for example, provide additional data storage capacity. The most common example of mass storage 820 is a hard disk drive. Mass storages 812, 820 generally store additional programming instructions, data, and the like that typically are not in active use by the processor 802. It will be appreciated that the information retained within mass storages 812 and 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display monitor 818, a network interface 816, a keyboard 804, and a pointing device 806, as well as an auxiliary input/output device interface, a sound card, speakers, and other subsystems as needed. For example, the pointing device 806 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing.

Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 8 is but an example of a computer system suitable for use with the various embodiments disclosed herein. Other computer systems suitable for such use can include additional or fewer subsystems. In addition, bus 814 is illustrative of any interconnection scheme serving to link the subsystems. Other computer architectures having different configurations of subsystems can also be utilized.

The methods or algorithmic steps described in light of the embodiments disclosed herein can be implemented using hardware, processor-executed software units, or combinations of both. Software units can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a pick-up digital certificate;
determining that the pick-up digital certificate is correct, comprising:
sending a query requesting to look up a reservation digital certificate by a logistic data center;
receiving the reservation digital certificate returned by the logistic data center;
determining that the reservation digital certificate is consistent with the pick-up digital certificate; and
in the event that the reservation digital certificate is consistent with the pick-up digital certificate, determining that the pick-up digital certificate is correct;
in the event that the pick-up digital certificate is correct, unlocking and opening a smart container storage division;
detecting that the smart container storage division is shut; and
after the storage division is shut:
generating a signed receipt message; and
sending the signed receipt message to a logistics data center.

2. The method as described in claim 1, wherein after the determining that the pick-up digital certificate is correct, ceasing to keep time.

3. The method as described in claim 2, wherein after the ceasing to keep time, calculating a storage fee based on a timekeeping result.

4. The method as described in claim 3, wherein after the calculating of the storage fee, opening the storage division.

5. The method as described in claim 1, wherein the receiving of the pick-up digital certificate includes scanning the pick-up digital certificate with a two-dimensional code scanner.

6. The method as described in claim 1, wherein:
after the receiving of the pick-up digital certificate, activating a recording unit to begin recording; and
in the event that the storage division is shut, ceasing to record, recorded content being saved locally or uploaded to the logistics data center.

7. The method as described in claim 1, wherein after the storage division is shut, changing a use status of the storage division based on the signed receipt message.

8. The method as described in claim 1, wherein content of the signed receipt message includes:
confirmation of pick up;
confirmation of the signed receipt message and an instruction to delete video associated with goods; or
a refusal to sign receipt and an instruction to store video associated with the goods.

9. The method as described in claim 1, wherein before the receiving of the pick-up digital certificate:
receiving the pick-up digital certificate by distribution equipment of express delivery personnel or mobile terminal of a recipient.

* * * * *